(12) United States Patent
Orchard

(10) Patent No.: US 8,336,251 B2
(45) Date of Patent: Dec. 25, 2012

(54) TRAPPING SYSTEM UTILIZING VIDEO ATTRACTANTS

(76) Inventor: Stanley A. Orchard, Victoria (CA)

( * ) Notice: Subject to any disclaimer, the term of this patent is extended or adjusted under 35 U.S.C. 154(b) by 987 days.

(21) Appl. No.: 12/370,840

(22) Filed: Feb. 13, 2009

(65) Prior Publication Data

US 2009/0205245 A1    Aug. 20, 2009

Related U.S. Application Data

(60) Provisional application No. 61/028,582, filed on Feb. 14, 2008.

(51) Int. Cl.
*A01M 23/02* (2006.01)
*A01M 23/04* (2006.01)
*A01M 23/08* (2006.01)

(52) U.S. Cl. .................. 43/66; 43/69; 43/60

(58) Field of Classification Search ............. 43/66
See application file for complete search history.

(56) References Cited

U.S. PATENT DOCUMENTS

| 224,960 | A | * | 2/1880 | Simpson | 43/66 |
| 1,738,623 | A | * | 12/1929 | Westerlund | 43/69 |
| 2,864,195 | A | * | 12/1958 | Bachmann | 43/4 |
| 5,836,104 | A | * | 11/1998 | Epps | 43/122 |
| 5,979,105 | A | * | 11/1999 | Marks | 43/61 |
| 6,016,623 | A | * | 1/2000 | Celestine | 43/61 |
| 6,202,340 | B1 | * | 3/2001 | Nieves | 43/61 |
| 6,807,766 | B1 | * | 10/2004 | Hughes et al. | 43/17.6 |
| 7,024,815 | B1 | * | 4/2006 | Visagie | 43/113 |
| 7,051,472 | B1 | * | 5/2006 | Kelly | 43/61 |

FOREIGN PATENT DOCUMENTS

FR     2747537      * 10/1997

* cited by examiner

*Primary Examiner* — Kimberly Berona
*Assistant Examiner* — Marc Burgess
(74) *Attorney, Agent, or Firm* — Davis & Bujold, PLLC

(57) ABSTRACT

A trapping system includes an enclosure with a one way entry which allows the pest to enter the enclosure, but prevents the pest from exiting through the entry. An attractant is positioned at the entry. The attractant is a video screen arranged relative to the trap door, such that a pest jumping at the video screen is deflected at a downward angle onto the trap door, and is specific to the pest which is to be trapped.

16 Claims, 4 Drawing Sheets

TRAPPING SYSTEM UTILIZING VIDEO ATTRACTANTS

FIELD

The present invention relates to a trapping system that uses attractants to lure pests into the trap.

BACKGROUND

There are hundreds of examples of invasive animal species including the American bullfrog (*Rana catesbeiana*), Green Frog (*Rana clamitans*), Cane Toad (*Bufo marinus*), Coqui's Frog (*Eleutherodactylus coqui*), African Clawed Frog (*Xenopus laevis*), etc. These not only prey upon and competitively exclude native species but can also be primary hosts of harmful parasites and pathogenic organisms. Frog species are used here as examples, but the basic principles are also applicable to a wide variety of other species groups. 'Invasive species' is a hot topic and an urgent environmental concern around the world because of their ecologically damaging effects. However, populations of many of the most problematical species are expanding out-of-control because no practical, environmentally friendly, species-specific techniques have been developed that can efficiently trap the animals faster than they can reproduce and faster than they can re-invade. Traditional capture techniques focus on trying to chase down these often elusive animals rather than passively luring them into self-activated traps. This trapping technique can also be used to quickly survey a site to determine if the target species is present. Additionally, it is useful as a quick response tool to catch released invasive species before they can establish a population foothold.

SUMMARY

There is provided a trapping system which includes an enclosure with a one way entry which allows the pest to enter the enclosure, but prevents the pest from exiting through the entry. An attractant is positioned at the entry to lure pest into the trapping system. The attractant is specific to the pest which is to be trapped.

When trapping frogs, beneficial results have been obtained when the one way entry is an access opening with a trap door through which the pest falls into the enclosure. The trap door, preferably is comprised of two pivoting halves hinged to opposed edges of the access opening and pivoting between a closed position covering the access opening and a downwardly angled open position. Biasing springs are provided to bias the two pivoting halves into the closed position.

Where power is available, a video screen showing a screen play of an insect may be used as an attractant for a frog. The screen play playing on the video screen can be augmented and reinforced by audio.

Where power is not available, an insect attractant may be used to lure insects, so that insects are buzzing over the trap door. The real buzzing insects may then serve as the attractant.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
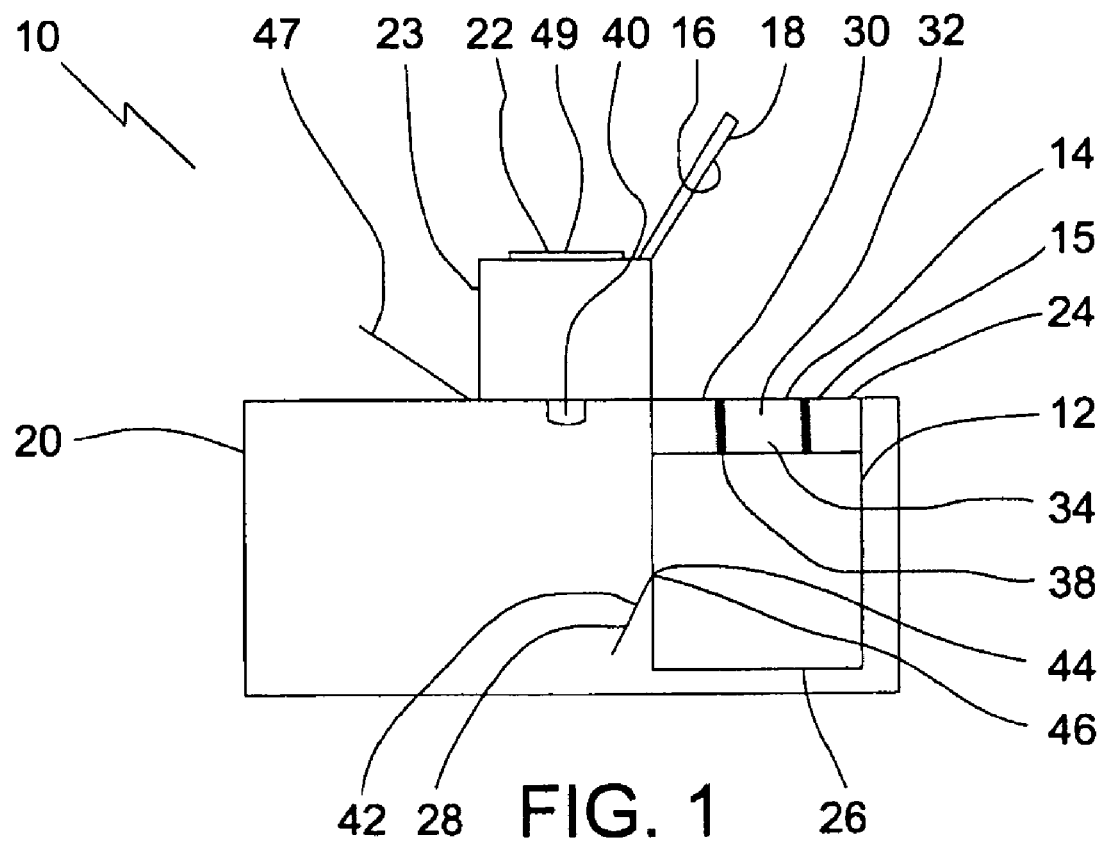
FIG. 1 is a side elevation view, in section, of a trapping system.

A trapping system generally identified by reference numeral 10, will now be described with reference to FIG. 1 through 7.

In its most basic form, the trapping system consists of an enclosure with a one way entry which allows the pest to enter the enclosure, but prevents the pest from exiting through the entry. A video screen is positioned at the entry displaying a screen play video of a visual attractant specific to the pest which is to be trapped. There will now be described a specific trapping system that was developed to trap frogs.

Figure 3:
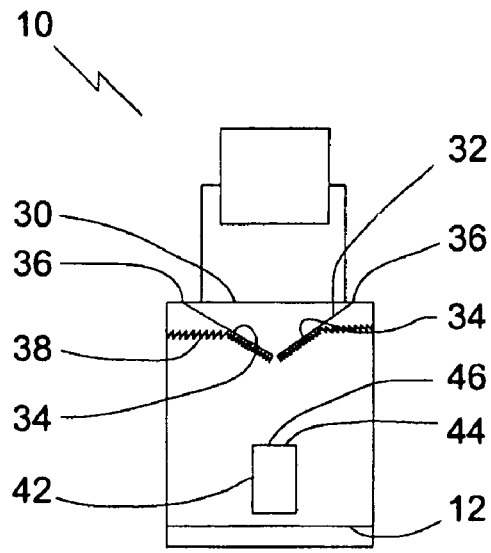
FIG. 3 is a front elevation view, in section, of the trapping system of FIG. 1 with the trap door closed.
Figure 4:
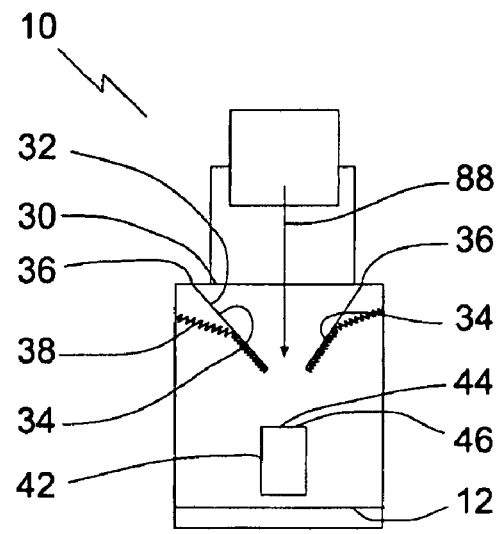
FIG. 4 is a front elevation view, in section, of the trapping system of FIG. 1 with the trap door open.

Structure and Relationship of Parts:

Referring to FIG. 1, a trapping system 10 consists of an enclosure 12, a first one way entry 14, a platform 15, a video screen 16, an audio system 18, a secondary enclosure 20, a portable power source 22 and a support housing 23. Enclosure 12 has a top 24, a bottom 26, and a second one way entry 28. As will hereinafter be further described, enclosure 12 may be equipped with a floatation device, so it floats. First one way entry 14 consists of an access opening 30 and a trap door 32. First one way entry 14 is positioned on top 24 of enclosure 12. Referring to FIGS. 3 and 4, trap door 32 consists of two pivoting halves 34 hinged to opposed edges 36 of access opening 30. Pivoting halves 34 are adapted to pivot between a closed position (as shown in FIG. 3) and a downwardly angled open position (as shown in FIG. 4). It is to be noted that even the closed position has a downward angle to it. The reason for this is to enhance sensitivity to make it operate as well with small frogs as with larger frogs. In addition, it would be undesirable for a large frog to be able to escape by leaping sideways. With the configuration illustrated, a portion of the frog would already be below the level of access opening 30 before it encountered the doors. With such an arrangement, a leg thrust by the frog will only serve to open the pivoting halves 34 of trap door 32. In order to make hinges more sensitive, a "living hinge" formed from flexible tape has been used. It has been found that tape used to patch boat sails works well, as it is waterproof, light, very adhesive, tough and quite flexible. Springs 38 are provided to bias both of pivoting halves 34 into the closed position. Pivoting halves 34 of trap door 32 actually rest upon springs 38. This configuration has been found to provide a desired degree of spring sensitivity. Trap door 32 allows pests (not shown) to enter enclosure 12 through access opening 30, with trap door 32 preventing pests from leaving enclosure 12 back through access opening 30. Referring to FIG. 1, video screen 16 is positioned above one edge of access opening 30. Video screen 16 displays a screen play video of a visual attractant specific to the pest which is to be trapped. An example of a visual attractant used to lure frogs may include a video of a dragonfly. Video screen 16 is angled downward toward trap door 32, such that a frog jumping at video screen 16 is deflected at a downward angle onto trap door 32. It is preferred that a plexiglass shield be provided on video screen 16, to protect it from being damaged when struck by a leaping frog. Audio system 18 may consist of at least one speaker (shown as being built into the edges of screen 16). Alternatively, audio system 18 may be provided as a separate unit. Video screen 16 and audio system 18 may be maintained in position by video screen support housing 23. Video screen support housing 23 is in the form of a lightweight lidded box that contains the battery-powered audio/video electronic components required for video screen 16 and audio system 18 to work properly. Referring to FIG. 1, audio system 18 is adapted to broadcast an audio attractant to lure pests within visual range of video screen 16. The audio attractant and the visual attractant may be synchronized, such that a pest is provided a convincing attractant that will lure the pest into falling through trap door 32. An example of this may include an audio attractant reproducing the fluttering of a dragonfly's wings, synchronized with a video image of a dragonfly as a visual attractant. It is important to note that the audio attractant and the video attractant need not be synchronized. The audio attractant is just to get the frog's attention. The audio attractant may be totally unrelated to the video image, as long as it does the job. The audio attractant draws the pest near video screen 16, where, in the case of the pest being a frog, the frog jumps at video screen 16 from the ground or from platform 15 in an attempt to capture the fictitious prey presented to them by visual screen 16 and audio system 16. Upon striking video screen 16, the frog is deflected downwards towards trap door 32, allowing the frog to enter enclosure 12.

Referring to FIG. 1, secondary enclosure 20 is connected to enclosure 12 via second one way entry 28. Secondary enclosure 20 may be provided as a lidded box. A light 40 is provided within secondary enclosure 20 which is visible from enclosure 12 to lure trapped pests, looking for a means of escape, from enclosure 12 to secondary enclosure 20. Second one way entry 28 is provided as a pivotally mounted door 42. Referring to FIG. 3, door 42 is provided with a hinge 44 positioned along a top peripheral edge 46. Referring to FIG. 1, door 42 may be made provided with one of a transparent or translucent portion, so that light 40 is visible to pests trapped in enclosure 12. Secondary enclosure 20 contains an access door 47 that can be used to remove pests from secondary enclosure 20 once the pests have been trapped. Secondary enclosure 20 may house enclosure 12, as shown in the embodiment of FIG. 1.

Figure 2:
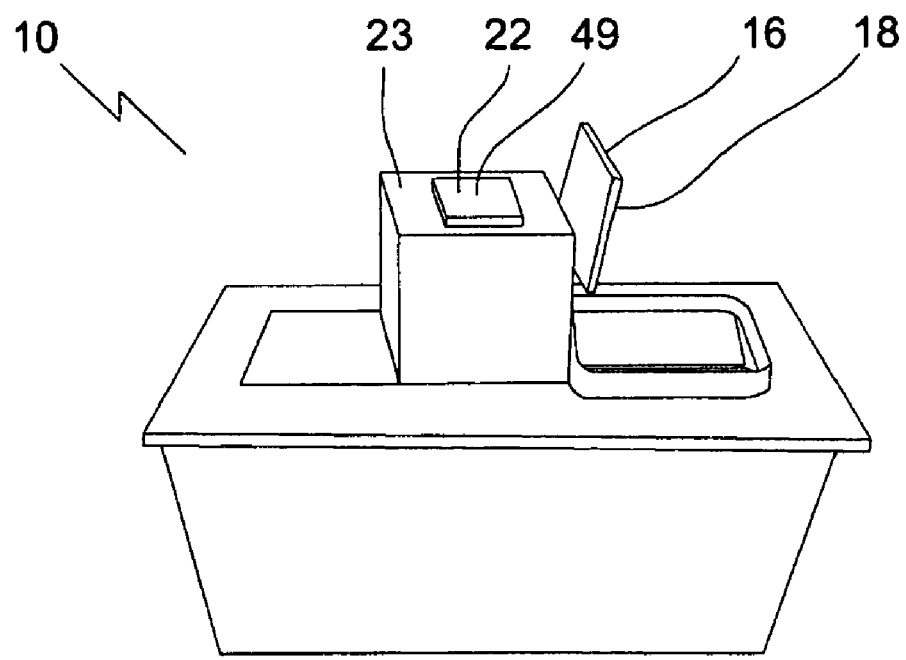
FIG. 2 is a side perspective view of the trapping system of FIG. 1.

Referring to FIG. 2, power source 22 is provided to supply power to video screen 16, audio system 18 and light 40 (shown in FIG. 1). In initial proto-types, solar panel 49 was used to power light 40 and a battery positioned within support housing 23 was used to power video screen 16 and audio system 18. It will be appreciated that if solar panel 49 is large enough it can meet all power needs or a battery can be used for all power needs. There are also other suitable forms of power source 22 including, but not limited to, an extension power cord for a normal plug-in to a residential power outlet.

Figure 5:
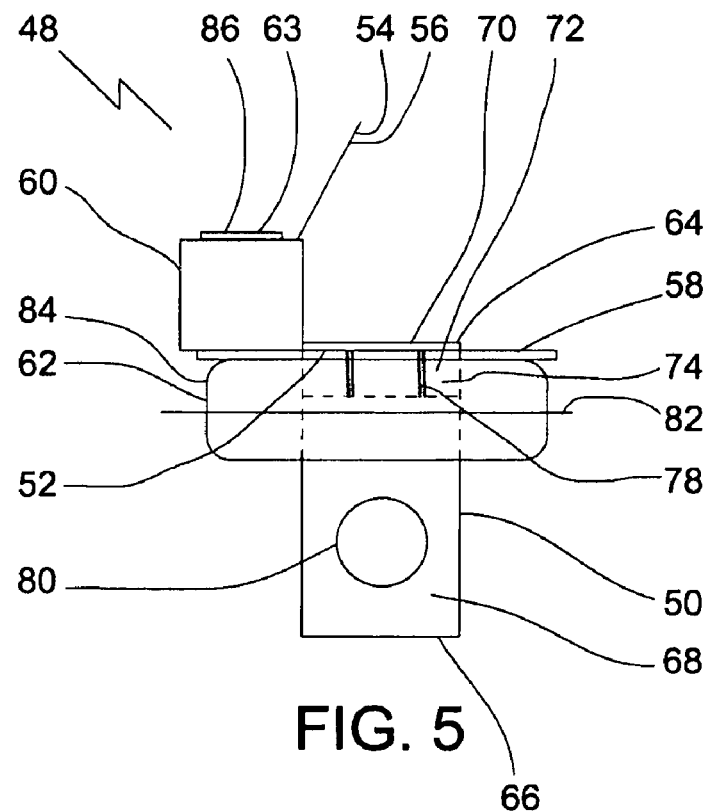
FIG. 5 is a side elevation view, in section, of a second embodiment of a trapping system that floats.
Figure 6:
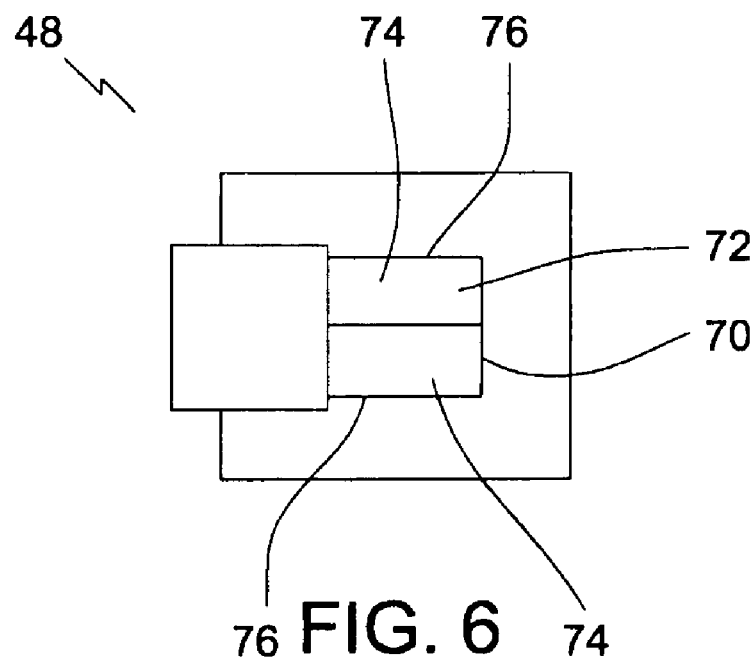
FIG. 6 is a top elevation view of the trapping system of FIG. 5.

Referring to FIG. 5, a second embodiment of a trapping system 48 that floats is provided. Trapping system 48 consists of an enclosure 50, a one way entry 52, a video screen 54, an audio system 56, a platform 58, a support housing 60, a flotation unit 62, and a portable power source 63. Enclosure 50 has a top 64, a bottom 66, and outer walls 68. The addition of flotation unit 62 adapted enclosure 50 to float. One way entry 52 consists of an access opening 70 and a trap door 72. One way entry 52 is positioned on top 64 of enclosure 50. Referring to FIG. 6, trap door 72 consists of two pivoting halves 74 hinged to opposed edges 76 of access opening 70. Pivoting halves 74 open and close in a fashion similar to that of pivoting halves 34 (as shown in FIGS. 3 and 4). Referring to FIG. 5, springs 78 are provided to bias both of pivoting halves 74 into the closed position. Trap door 72 functions in a fashion similar to that described for trap door 32. Referring to FIG. 5, video screen 54 and audio system 56 are positioned over and along an edge of access opening 70. Video screen 54 and audio system 56, respectively, function in a fashion similar to that described above for video screen 16 and audio system 18, respectively. Video screen 54 is angled downward toward trap door 72, such that a pest jumping at video screen 54 from platform 58 is deflected at a downward angle onto trap door 72. Audio system 56 may consist of at least one speaker (shown as being positioned along the edge of video screen 54). Alternatively, audio system 56 may be provided as a separate unit. Video screen 54 and audio system 56 may be maintained in position by video screen support housing 60. Support housing 60 may be provided as a lightweight lidded box that contains the battery-powered audio/video electronic components required for video screen 54 and audio system 56 to work properly. Referring to FIG. 5, a secondary audio system 80 may be provided on outer walls 68 of enclosure 50, below a water level 82. Secondary audio system 80 is able to transmit audio signals attractive to pests underwater, enticing pests towards trapping system 48. It is preferred that secondary audio system 80 be mounted externally of enclosure 50, so that it does not occupy space needed for frogs.

Figure 7:
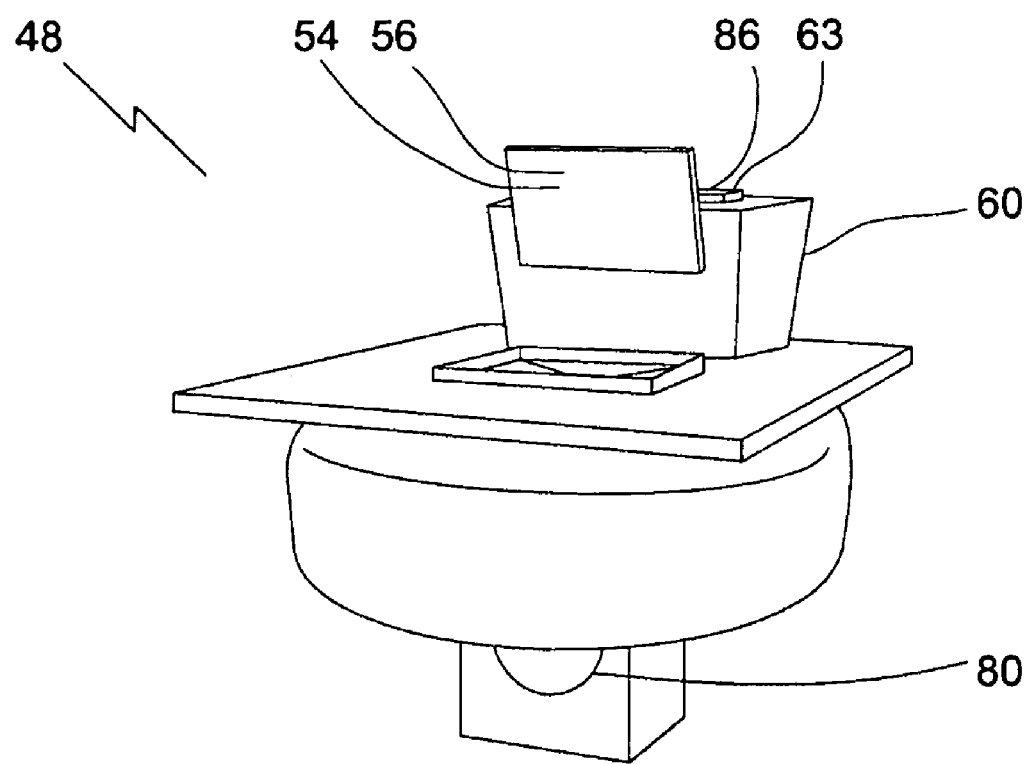
FIG. 7 is a side perspective view of the trapping system of FIG. 5.

Referring to FIG. 5, flotation unit 62 allows trapping system 48 to float with platform 58, support housing 60, one way entry 52, video screen 54, audio system 56 and portable power source 63 maintained above water level 82. Flotation unit 62 is described for FIG. 5 as a tire 84 filled with plastic foam, but alternative types of flotation units 62 may be used instead. Referring to FIG. 7, power source 63 is provided to supply power to video screen 54, audio system 56 and secondary audio system 80. Power source 63 is provided as a solar panel 86. Alternatively, other suitable forms of power source 63 may be used including, but not limited to, batteries or an extension power cord for a normal plug-in. In addition, power source 63 may be contained within support housing 60.

Trapping system 48 is adapted to trap small numbers of animals who are in relatively inaccessible habitats, such as dense reed marshes, willow thickets and profusions of emergent water lilies.

It should be noted that all the components described above for trapping systems 10 and 48 may be made out of waterproof, weatherproof and wildlife proof materials. Because of the fact that trapping systems 10 and 48 will be used in the harsh environments of the outdoors, they must be constructed with a strong durable design that will allow them to function properly under adverse conditions.

Trapping systems 10 and 48 incorporate the results of analyses of the target animal's responses to various aural and visual cues. From these analyses a library of sounds and images that are irresistible to the target species have been derived. These stimuli may be provided as synthesized or natural representations, or combinations of both—depending upon the target species' preferences. Synthetically produced sounds may vary in amplification, amplitude, and modulation. Trapping systems 10 and 48 employ these sounds and images in various combinations and configurations to lure and trap the target pest. The development of trapping systems 10 and 48 has involved the use of sensory psychological profiling to understand how to manipulate the behaviour of the pest. This profiling has also taken into account age-class and gender differences in the target species.

Operation:

Referring to FIG. 1, trapping system is provided as shown, in an environment known to contain the target species of frogs. The audio attractant provided by audio system 18 entices a frog from the target species near trapping system 10 to move within the vicinity of video screen 16. Upon making visual contact with video screen 16, images of real or animated representations of prey emanating from video screen 16 along with synchronized sounds emanating from audio system 18 will entice the frog to lunge at video screen 16. Upon coming into contact with video screen 16, the frog will be deflected downwards onto trap door 32. Alternatively, the frog may be drawn by the audio and visual attractants to hop onto trap door 32 in preparation for its attack of the video screen. Referring to FIG. 4, upon coming into contact with trap door 32, pivoting halves 34 open downwardly as a result of the weight of the frog, allowing the frog to fall into enclosure 12. The frog will fall into enclosure 12 along the direction indicated by arrow 88. Referring to FIG. 3, upon the frog passing through access opening 30, springs 38 immediately bias pivoting halves 34 to close, thus preventing the frog from exiting enclosure 12 via access opening 30.

Referring to FIG. 1, upon becoming captured in enclosure 12, the frog will immediately attempt to escape enclosure 12. Illumination from light 40 travels through door 42, offering the prospect of escape, and drawing the frog towards door 42. Upon passing through door 42 into secondary enclosure 20, the one-way design of door 42 prevents the frog from re-entering enclosure 12. The frog is now contained with secondary enclosure 12, and will remain there until removed from trapping system 10. In order to empty trapping system 10, access door 47 is opened and all the captured frogs within are removed. This offers a safe, humane method of capturing and relocating frogs.

Referring to FIG. 5, trapping system 48 is positioned in an aquatic environment known to contain the target species of frogs. The audio attractant provided by audio system 56 entices a frog from the target species near trapping system 48 to move within the vicinity of video screen 54. Alternatively, the frog may be drawn towards trapping system 48 upon hearing enticing sounds emanating from secondary audio system 80 underwater. Upon making visual contact with video screen 54, images of real or animated prey emanating from video screen 54 along with synchronized sounds emanating from audio system 56 will entice the frog to lunge at video screen 54. The frog may lunge at video screen 54 from the water or from platform 58. Upon coming into contact with video screen 54, the frog will be deflected downwards onto trap door 72. Alternatively, the frog may be drawn by the audio and visual attractants to hop onto trap door 72 as it seeks to get closer to the attractant on the video screen. Upon coming into contact with trap door 72, pivoting halves 74 open downwardly as a result of the weight of the frog, allowing the frog to fall into enclosure 50. Upon the frog passing through access opening 70, springs 78 immediately bias pivoting halves 74 to close, thus preventing the frog from exiting enclosure 50 via access opening 70. The frog is now captured within trapping system 50. In order to remove any frogs contained within enclosure 50, trap door 72 may be removed and enclosure 50 emptied of frogs. This offers a safe, humane method of trapping frogs in an aquatic environment.

Advantages:

This system is weather resistant, wildlife resistant, species specific, eco-friendly, humane, portable, practical and easy to construct and maintain. The present invention relates to an international need for new techniques to trap pest species whose populations must be controlled because they are an invasive menace or are, for whatever reason, otherwise environmentally threatening, e.g. disease bearing.

Variations:

Many variations are possible for the methods of attracting the target species to be captured by either of trapping systems 10 or 48. These include using heat, different entrance designs, different trapping system dimensions, and placing the trapping system in different locations, to name a few. In addition, variations on this system can be adapted to function on land, on water, and below water. The embodiments illustrated were developed to trap frogs. Some variations would necessarily be required to adapt the trapping systems for use with other pests, such as rats. Moreover, it will be appreciated that a variety of attractants can be employed as alternatives to audio and video systems, and different attractants can be tailored according to the type of pest being lured.

Figure 8:
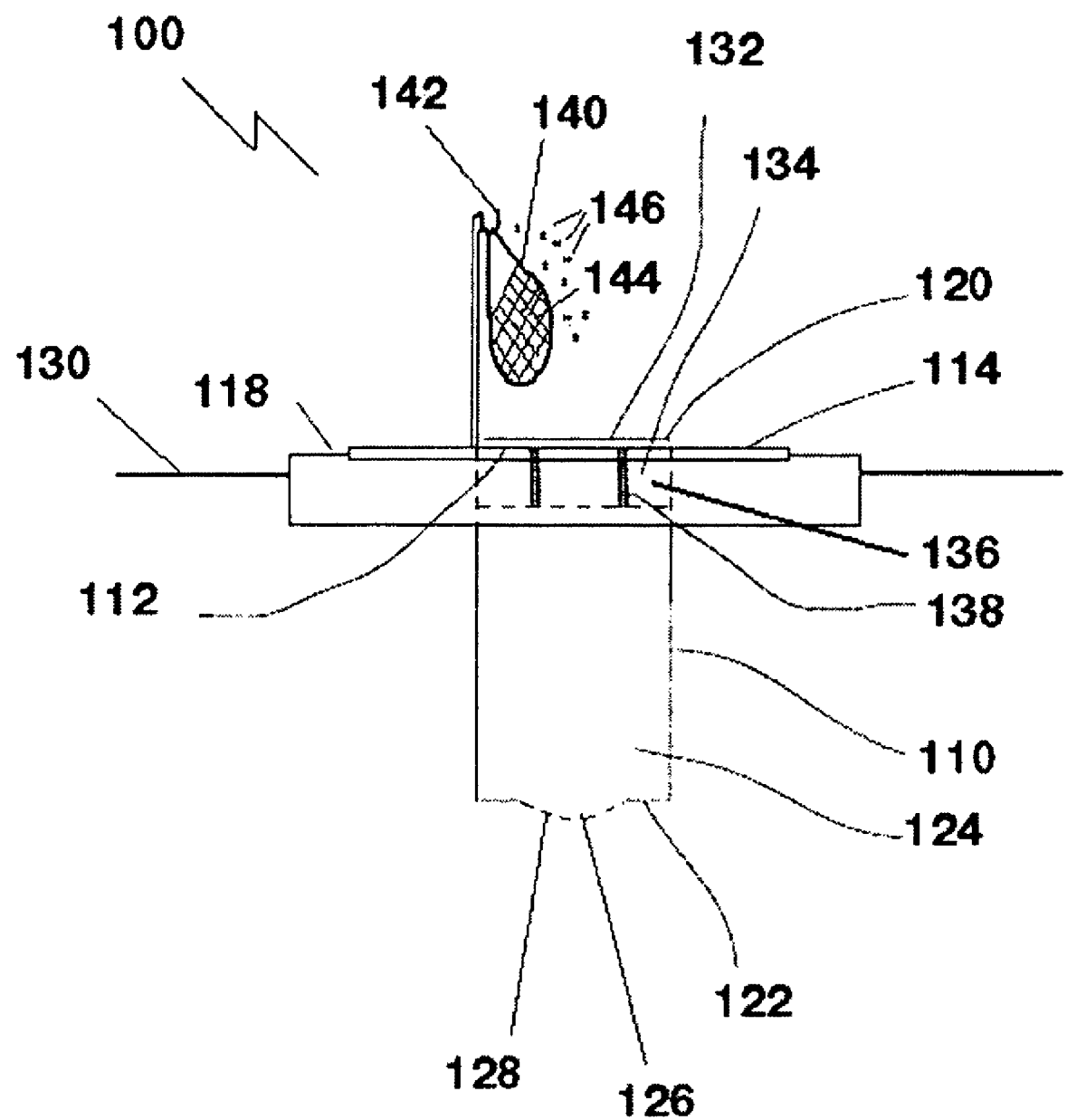
FIG. 8 is a side elevation view, in section, of third embodiment of a trapping system that floats.

Referring to FIG. 8, there is illustrated an example of a third embodiment of trapping system generally referenced by numeral 100. Trapping system 100 is similar to second illustrated embodiment 48 illustrated in FIGS. 5 through 7, in that trapping system 100 floats. It is simplified variation in that the attractant is neither a video screen nor an audio system but rather, the attractant is live insects which are less expensive than video and sound systems, and more readily available. Furthermore, they appear to be more effective at luring frogs.

Referring to FIG. 8, trapping system 100 includes an enclosure 110 and a one way entry 112, a platform 114, a support housing 116, a flotation unit 118. Enclosure 110 has a top 120, a bottom 122, and outer walls 124. Bottom 122 has an opening 126 with a perforated cover 128. Flotation unit 118 is of foam, and is positioned to permit enclosure 110 to sit lower in the water 130. One way entry 112 consists of an access opening 132 and a trap door 134. One way entry 130 is positioned on top 120 of enclosure 110. Trap door 134 consists of two pivoting halves 136 that open and close in a fashion similar to pivoting halves 34 shown in FIGS. 3 and 4. Springs 138 are provided to bias both of pivoting halves 136 into the closed position. Pivoting halves 136 of trap door 134 actually rest upon springs 138. This configuration has been found to provide a desired degree of spring sensitivity. Trap door 134 allows pests (not shown) to enter enclosure 110 through access opening 132, with trap door 134 preventing pests from exiting enclosure 110 back through access opening 132.

Referring again to FIG. 8, with trapping system 100, no video screen or audio system is provided, and as such no portable power source required either. Instead, with trapping system 100, a mesh bag 140 is suspended from a hook 142 above platform 114. Mesh bag 140 contains a substance 144 which attracts insects 146. Substance 144 will vary with the type of insect 146 which one wishes to attract. It may be a rotting piece of fruit, a piece of meat, or a piece of fish. The type of insect one wishes to attract will vary, with the location and the type of insect that is part of the regular diet of the frog, such as flies and wasps. Insects 146 are attracted to substance 144 and buzz around mesh bag 140 making sounds which attract the frogs. The frogs are then further enticed by the visual attraction of the buzzing insects 146. In the illustrated trapping system 100, frogs jumping at insects 146 land on trap door 134.

Upon coming into contact with trap door 134, pivoting halves 136 open downwardly as a result of the weight of the frog, causing the frog to fall into enclosure 110. As frog passes through access opening 132, springs 138 immediately bias pivoting halves 136 to close, thus preventing the frog from exiting enclosure 110 via access opening 132. Opening 126 in bottom 122 has perforated cover 128 to allow water to flow into and out of enclosure 110 but prevents frogs from escaping.

As with previous embodiments of trapping system described above, trapping system 100 operates when placed in an aquatic environment known to contain the target species of frogs. The insects 146, buzzing around mesh bag 140, lures a frog from the target species near trapping system 100. Upon making visual contact with insects 146, the frog may lunge at insects 146. As previously described, upon lunging at insects 146, the frog will land on trap door 134. Alternatively, the frog may be drawn by insects 146 to hop onto trap door 134 as it seeks to get closer to the attractant. Upon coming into contact with trap door 134, pivoting halves 136 open downwardly as a result of the weight of the frog, allowing the frog to fall into enclosure 110. The frog is now captured within trapping system 100. In order to remove any frogs contained within enclosure 110, trap door 134 may be removed and enclosure 110 emptied of frogs. This offers a safe, humane method of trapping frogs in an aquatic environment.

Trapping systems 10, 48 and 100 are adapted to trap small numbers of animals who are in relatively inaccessible habitats, such as dense reed marshes, willow thickets and profusions of emergent water lilies.

It should be noted that all the components described above for trapping systems 10, 48, and 100 may be made out of waterproof, weatherproof and wildlife proof materials. Because of the fact that trapping systems 10, 48 and 100 will be used in the harsh environments of the outdoors, they must be constructed with a strong durable design that will allow them to function properly under adverse conditions.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A trapping system, comprising:
   at least one enclosure;
   a one way entry which allows the pest to enter the enclosure, but prevents the pest from exiting through the entry, the one way entry is an access opening with a trap door through which the pest falls into the enclosure, the trap door comprising two pivoting halves hinged to opposed edges of the access opening and pivoting between a closed position covering the access opening and a downwardly angled open position, biasing means being provided to bias the two pivoting halves into the closed position, and
   an attractant positioned at the entry, the attractant being specific to the pest which is to be trapped wherein the attractant comprises a video screen positioned above an edge of the access opening, wherein the video screen is arranged relative to the trap door, such that a pest jumping at the video screen is deflected at a downward angle onto the trap door.

2. The trapping system of claim 1, wherein the attractant is an audio system with at least one audio speaker is provided to broadcast an audio attractant to lure pests within visual range of the video screen.

3. The trapping system of claim 2, wherein the audio and visual attractant are synchronized.

4. The trapping system of claim 1 wherein an insect attractant is positioned at the entry, insects lured by the insect attractant serving as the attractant to entice pests to jump onto the trap door.

5. The trapping system of claim 1, wherein a secondary enclosure is provided with a one way entry from the enclosure to the secondary enclosure, a light being provided within the secondary enclosure which is visible from the enclosure to lure trapped pests looking for a means of escape from the enclosure to the secondary enclosure.

6. The trapping system of claim 5, wherein the one way entry between the enclosure and the second enclosure is a pivotally mounted door with one of a transparent or translucent portion.

7. The trapping system of claim 6, the one way entry between the enclosure and the second enclosure is a pivotally mounted door with a hinge positioned along a top peripheral edge.

8. The trapping system of claim 1, wherein a power source is provided to supply power to the video screen and other operating equipment requiring power.

9. The trapping system of claim 1, wherein the enclosure floats.

10. A trapping system, comprising:
    an enclosure;
    a one way entry in the form of an access opening with a trap door through which the pest falls into the enclosure thereby allowing the pest to enter the enclosure, but preventing the pest from exiting through the entry;
    a video screen positioned along an edge of the access opening at the one way entry displaying a screen play video of a visual attractant specific to the pest which is to be trapped wherein the video screen is arranged relative to the trap door, such that a pest jumping at the video screen is deflected at a downward angle onto the trap door;
    an audio system with at least one audio speaker is provided to broadcast an audio attractant to lure pests within visual range of the video screen;
    a secondary enclosure with a one way entry from the enclosure to the secondary enclosure, a light being provided within the secondary enclosure which is visible from the enclosure to lure trapped pests looking for a means of escape from the enclosure to the secondary enclosure; and
    a portable power source to supply power to the video screen, the at least one audio speaker and the light within the secondary enclosure.

11. The trapping system of claim 10, wherein a transparent shield is provided to protect the video screen from damage caused by pests striking the video screen.

12. The trapping system of claim 10, wherein the trap door consists of two pivoting halves hinged to opposed edges of the access opening and pivoting between a closed position covering the access opening and a downwardly angled open position, springs being provided to bias the two pivoting halves into the closed position.

13. The trapping system of claim 10, wherein the audio attractant and the visual attractant are synchronized.

14. The trapping system of claim 10, wherein the one way entry between the enclosure and the second enclosure is a pivotally mounted door with one of a transparent or translucent portion.

15. The trapping system of claim 10, the one way entry between the enclosure and the second enclosure is a pivotally mounted door with a hinge positioned along a top peripheral edge.

16. A trapping system, comprising:

an enclosure;

a flotation device enabling the enclosure to float in a stable orientation on water;

a one way entry in the form of an access opening with a trap door through which the pest falls into the enclosure thereby allowing the pest to enter the enclosure, but preventing the pest from exiting through the entry;

a video screen positioned above an edge of the access opening at the one way entry displaying a screen play video of a visual attractant specific to the pest which is to be trapped wherein the video screen is arranged relative to the trap door, such that a pest jumping at the video screen is deflected at a downward angle onto the trap door, an audio system with at least one audio speaker to broadcast an audio attractant to lure pests within visual range of the video screen; and a portable power source to supply power to the video screen and the at least one audio speaker.

* * * * *